United States Patent
Chan et al.

(10) Patent No.: US 11,205,232 B1
(45) Date of Patent: *Dec. 21, 2021

(54) SYSTEMS AND METHODS FOR ASSESSING RISK BASED ON DRIVER GESTURE BEHAVIORS

(71) Applicant: STATE FARM MUTUAL AUTOMOBILE INSURANCE COMPANY, Bloomington, IL (US)

(72) Inventors: Aaron Scott Chan, Bloomington, IL (US); Kenneth Jason Sanchez, San Francisco, CA (US); Chase Southwood, Bloomington, IL (US); Sukeerthi Khadri, Plainsboro, NJ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/394,956

(22) Filed: Apr. 25, 2019

Related U.S. Application Data (63) Continuation of application No. 14/841,875, filed on Sep. 1, 2015, now Pat. No. 10,319,037.

(51) Int. Cl.
*G06Q 40/08* (2012.01)
*B60W 40/09* (2012.01)

(52) U.S. Cl.
CPC ............ *G06Q 40/08* (2013.01); *B60W 40/09* (2013.01)

(58) Field of Classification Search
CPC ..................................... G06Q 40/08

USPC .......................................................... 705/4
See application file for complete search history.

(56) References Cited

U.S. PATENT DOCUMENTS

| | | | |
|---|---|---|---|
| 6,575,902 B1 * | 6/2003 | Burton | B60T 7/12 |
| | | | 600/300 |
| 9,751,534 B2 * | 9/2017 | Fung | G16H 50/20 |
| 10,319,037 B1 * | 6/2019 | Chan | G06Q 40/08 |
| 10,963,967 B1 * | 3/2021 | Lafeir | B60Q 9/00 |
| 2008/0143504 A1 | 6/2008 | Martin Alvarez | |
| 2011/0077028 A1 | 3/2011 | Wilkes, III et al. | |
| 2014/0139655 A1 | 5/2014 | Mimar | |
| 2014/0300739 A1 | 10/2014 | Mimar | |
| 2015/0025917 A1 * | 1/2015 | Stempora | G06K 9/0061 |
| | | | 705/4 |
| 2015/0099495 A1 * | 4/2015 | Crosbie | G06F 1/1632 |
| | | | 455/414.3 |

(Continued)

OTHER PUBLICATIONS

"Is hands-free cellphone use really safer for driving? We ask Myth Busters" Washington Post (Year: 2015).*

(Continued)

*Primary Examiner* — Bruce I Ebersman (74) *Attorney, Agent, or Firm* — Marshall, Gerstein & Borun LLP (57) ABSTRACT

A system and method captures various gestures or movements made by a driver of a vehicle while driving. Based on the captured gestures or movements, the system and method determines driver gesture behaviors which relate to the driver's driving behaviors. The system and method then performs risk assessment by correlating the driver gesture behaviors with potential recognizable losses involving the driver and/or vehicle. Based on the risk assessment, the system and method assigns ratings for the driver which may be used for insurance rating purposes.

18 Claims, 5 Drawing Sheets

(56) References Cited

U.S. PATENT DOCUMENTS

2016/0046298 A1     2/2016   DeRuyck et al.
2016/0196823 A1     7/2016   Yellambalase

OTHER PUBLICATIONS

Vallet, "How cops know you are texting while driving", Oct. 21, 2014, https://www.insurance.com/auto-insurance/auto-insurance-basics/how-cops-know-youre-texting.html, 4 pages.

* cited by examiner

SYSTEMS AND METHODS FOR ASSESSING RISK BASED ON DRIVER GESTURE BEHAVIORS

CROSS-REFERENCE TO RELATED APPLICATION

This application is a continuation of U.S. application Ser. No. 14/841,875, which was filed on Sep. 1, 2015 and is titled "Systems and Methods for Assessing Risk Based on Driver Gesture Behaviors," the entire disclosure of which is expressly incorporated herein by reference.

TECHNICAL FIELD

The present application relates generally to insurance and, more specifically, to systems and methods for assessing risk based on driver gesture behaviors for insurance rating purposes.

BACKGROUND

Providers of vehicle insurance generally seek to determine an insurance policy premium that is appropriate given the risk of losses recognizable under the policy. It is understood among insurance providers that certain driver gesture behaviors, such as those related to a driver's hand or head movements while driving, may affect or impact the likelihood of a recognizable loss. For example, someone who drives with one hand while texting with another is more likely to be distracted and thus more likely to incur a recognizable loss (e.g., causing a crash) than someone who does not text while driving. As such, insurance providers would like to assign a more positive rating and offer lower premiums for a given level of coverage to drivers who demonstrate gesture behaviors that correspond to a lower risk of loss. On the other hand, for those drivers who demonstrate gesture behaviors that correspond to a higher risk of loss, insurance providers would like to assign a more negative rating and dispense higher premiums for the same level of coverage.

Unfortunately, many insurance providers do not have an accurate way of determining driver gesture behaviors of a driver. In some cases, the driver may be asked to provide information regarding gesture behaviors by responding to various queries or surveys. However, information gathered in this manner is often fraught with inaccuracy and/or is limited in scope. Moreover, some driver gesture behaviors that affect the likelihood of losses may not be well characterized, and in any case may be difficult to obtain or assess based on questionnaires. As a result, insurance ratings and premiums determined for the driver (or policy holder) may be poorly correlated with the true risk of loss associated with the driver.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method for assessing risk based on driver gesture behaviors may include determining, by a behavioral classification module of a computing device, one or more driving behaviors of a driver based on one or more gestures made by the driver while driving a vehicle during each of a plurality of driving sessions. The method may also determine, by a risk assessment module of a computing device, a risk of loss associated with each of the one or more driving behaviors determined for each of the plurality of driving sessions. Further, the method may determine, by a risk assessment module of a computing device, a driving session rating for each of the plurality of driving sessions based on the determined risk of loss associated with each of the one or more driving behaviors in each of the plurality of driving sessions. Still further, the method may determine, by a risk assessment module of a computing device, an overall driver score for the driver based on the driving session rating determined for each of the plurality of driving sessions.

A non-transitory computer-readable storage medium may comprise computer-readable instructions to be executed on one or more processors of a computing device for assessing risk based on driver gesture behaviors. The instructions when executed, may cause the one or more processors to determine one or more driving behaviors of a driver based on one or more gestures made by the driver while driving a vehicle during each of a plurality of driving sessions. The instructions when executed, may also cause the one or more processors to determine a risk of loss associated with each of the one or more driving behaviors determined for each of the plurality of driving sessions. Further, the instructions when executed, may cause the one or more processors to determine a driving session rating for each of the plurality of driving sessions based on the determined risk of loss associated with each of the one or more driving behaviors in each of the plurality of driving sessions. Still further, the instructions when executed, may cause the one or more processors to determine an overall driver score for the driver based on the driving session rating determined for each of the plurality of driving sessions.

A system for assessing risk based on driver gesture behaviors may comprise a mobile device and an on-board computer of a vehicle. Each of the mobile device and on-board computer includes a memory that stores instructions for execution on one or more processors. The instructions stored in the memory of the on-board computer, when executed by the one or more processors of the on-board computer, may cause the on-board computer to receive one or more gestures made by a driver while driving the vehicle during each of a plurality of driving sessions. The instructions stored in the memory of the on-board computer, when executed by the one or more processors of the on-board computer, may also cause the on-board computer to determine one or more driving behaviors of the driver based on the one or more gestures received for each of the plurality of driving sessions. Further, the instructions stored in the memory of the on-board computer, when executed by the one or more processors of the on-board computer, may cause the on-board computer to transmit the one or more driving behaviors determined for each of the plurality of driving sessions to the mobile device. The instructions stored in the memory of the mobile device, when executed by the one or more processors of the mobile device, may cause the mobile device to receive the one or more driving behaviors determined for each of the plurality of driving sessions. The instructions stored in the memory of the mobile device, when executed by the one or more processors of the mobile device, may also cause the mobile device to determine a risk of loss associated with each of the one or more driving behaviors determined for each of the plurality of driving sessions. Further, the instructions stored in the memory of the mobile device, when executed by the one or more processors of the mobile device, may cause the mobile device to determine a driving session rating for each of the plurality of driving sessions based on the determined risk of loss associated with each of the one or more driving behaviors in each of the plurality of driving sessions. Moreover, the instructions stored in the memory of the mobile device, when executed by the one or more processors of the mobile device, may cause the mobile device to determine an overall driver score for the driver based on the driving session rating determined for each of the plurality of driving sessions.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Generally speaking, the disclosed system detects and captures various gestures or movements made by a driver while driving a vehicle. Based on these captured gestures or movements, the disclosed system determines driver gesture behaviors which relate to the driver's driving behaviors. The disclosed system then performs risk assessment by correlating the driver gesture behaviors with potential recognizable losses involving the driver and/or vehicle. Based on the risk assessment, the disclosed system assigns ratings for the driver, which may be used to adjust or modify the driver's insurance policy premium.

Figure 1:
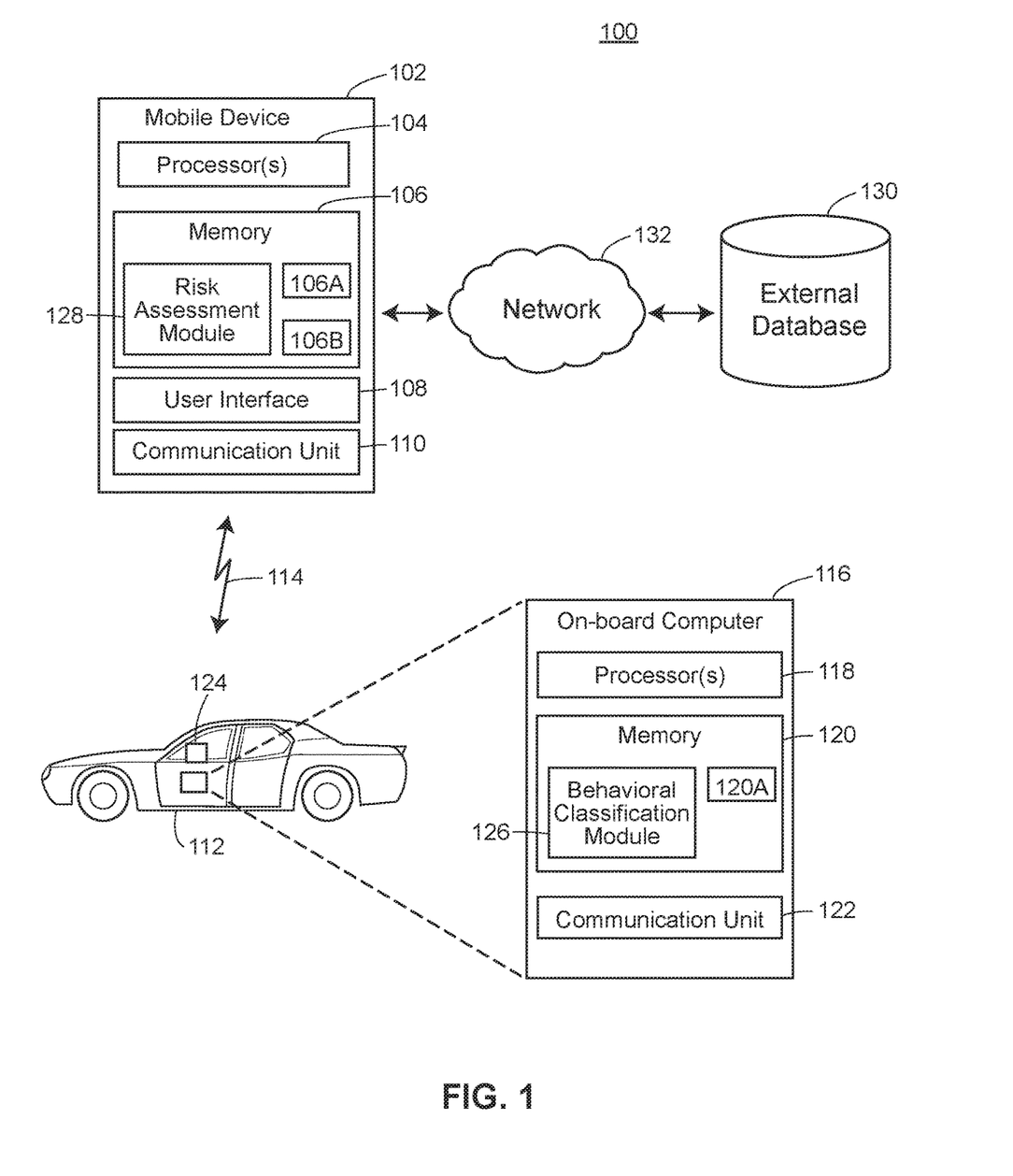
FIG. 1 is a block diagram of an example system for assessing risk based on driver gesture behaviors.

Referring first to FIG. 1, which is a block diagram of an example system 100 for assessing risk based on driver gesture behaviors. The example system 100 includes a mobile device 102 having one or more processors 104, a memory 106, a user interface 108 (e.g., a display screen, a touchscreen, a keyboard, etc.), and a communication unit 110. The mobile device 102 may be a smartphone, a tablet computer, a personal digital assistant, a wearable computer, or any other mobile computing device.

The mobile device 102 may be communicatively connected to a vehicle 112 (e.g., a car). In particular, the mobile device 102 may use the communication unit 110 to connect to the vehicle 112 over a wireless link 114. As such, the vehicle 112 may be equipped with an on-board computer 116 having one or more processors 118, a memory 120, and an on-board communication unit 122. In some embodiments, the on-board computer 116 may be permanently installed in the vehicle 112 (e.g., by the vehicle manufacturer). In other embodiments, the on-board computer 116 may be an aftermarket on-board computer system. In some embodiments, the on-board computer 116 may include or interface with other components in the vehicle 112 such as vehicle sensors (e.g., braking sensor, speedometer, gyroscope, etc.), navigational units (e.g., global positioning system (GPS)), speakers, displays, etc.

Generally, the connection between the mobile device 102 and the vehicle 112 involves short range wireless communication. In the embodiment of FIG. 1, short range wireless communication is implemented using Bluetooth, although other technologies (e.g., near field communication (NFC), radio frequency identification (RFID), etc.) can also be used. When using Bluetooth, the on-board communication unit 122 may transmit a unique identification number (e.g a media access control (MAC) address associated with the on-board computer 116 in the vehicle 112) over the wireless link 114. If the mobile device 102 is within range of the transmission, the communication unit 110 may receive the unique identification number and compare that number to a list of stored identification numbers. If a match is found, then the mobile device 102 may identify and connect to the vehicle 112. If desired, new identification numbers can be added to the list of stored identification numbers. This allows the mobile device 102 to identify and connect to new vehicles. Additionally, a user can manually connect the mobile device 102 to a particular vehicle by selecting an identification number associated with the particular vehicle from the list of stored identification numbers.

A motion sensing unit 124 may be included in the vehicle 112 to detect and capture gestures or movements made by a driver of the vehicle 112. For example, the motion sensing unit 124 may be a camera, a video recorder, an image sensor, a three-dimensional (3D) motion capturing device, etc. The motion sensing unit 124 may be communicatively connected to the on-board computer 116. In some embodiments, the motion sensing unit 124 may be part of or included in the on-board computer 116. The motion sensing unit 124 may be installed or mounted in the vehicle 112 such that the motion sensing unit 124 faces the front side of the driver (e.g., on the dashboard). This enables the motion sensing unit 124 to detect and capture various head, face, eyes, hands, arms or body movements that the driver makes while driving the vehicle 112.

In operation, the driver may bring the mobile device 102 to the vehicle 112 when the driver decides to start a driving session (i.e., when the driver decides to drive the vehicle 112 from one location to another). Once the driver turns on the vehicle 112, the communication unit 110 of the mobile device 102 may communicate over the wireless link 114 with the on-board communication unit 122 to identify and connect to the vehicle 112 by using, for example, Bluetooth. When the mobile device 102 is successfully connected to the vehicle 112, the motion sensing unit 124 may be activated to begin detecting and capturing the driver's gestures or movements during the course of the driving session. At the end of the driving session, the motion sensing unit 124 may be deactivated when the user shuts off the vehicle 112 to terminate the connection between the mobile device 102 and the vehicle 112.

During the driving session, all captured gestures or movements along with their respective timestamps indicating the time of capture are logged and saved in the memory 120 of the on-board computer 116 as driver gesture data 120A. The on-board computer 116 may process the data 120A to determine driver gesture behaviors, which represent the driver's driving behaviors in view of the captured gestures or movements made by the driver while driving. In order to accomplish this, the on-board computer 116 includes a behavioral classification module 126, which may be in the form of computer executable instructions stored in the memory 120 and executed using the one or more processors 118.

The behavioral classification module 126 operates to analyze and categorize the driver gesture data 120A. In particular, the behavioral classification module 126 determines the driver's driving behaviors based on the captured gestures or movements in the data 120A. For example, if the captured gestures or movements in the data 120A indicate that the driver's two hands were placed on the wheel during the driving session, then the behavioral classification module 126 may determine the driving behavior as "hands on wheel while driving." As another example, if the captured gestures or movements in the data 120A indicate that only one of the driver's hands was on the wheel while the other hand was texting on a mobile phone, then the behavioral classification module 126 may determine the driving behavior as "texting while driving." Other similar driving behaviors (e.g., "playing with a car radio while driving," "holding a coffee cup while driving," etc.) can also be determined by analyzing and categorizing the data 120A.

Of course, the captured gestures or movements in the driver gesture data 120A are not limited to movements involving the driver's hands. The data 120A may include other types of gestures or movements related to the driver's head, face, eyes, arms or body. The behavioral classification module 126 may separately determine various driving behaviors based on these other types of gestures or movements. Alternatively or additionally, the behavioral classification module 126 may determine driving behaviors by using a combination of different types of gestures or movements. For example, if the data 120A shows that the driver's two hands were on the wheel while the driver's head was looking forward during the driving session, then the behavioral classification module 126 may determine the driving behavior as "two hands on wheel, head looking forward."

Further, the behavioral classification module 126 may generally classify each determined driving behavior as corresponding to either normal or distracted driving behavior. For example, "hands on wheel while driving" or "two hands on wheel, head looking forward" may be considered normal driving behaviors, whereas "texting while driving" may be considered a distracted driving behavior.

Gestures or movements made by the driver during the driving session may be continuously captured in sets at regular intervals (e.g., every minute). Each captured set may be saved as part of the driver gesture data 120A. For each set, the behavioral classification module 126 may determine the driving behavior by using any, all or a combination of the captured gestures or movements in the set. In general, the behavioral classification module 126 may employ any number and type of classification techniques (e.g., pattern recognition, clustering algorithm, correlation analysis, probabilistic analysis, etc.) to determine the driving behavior.

During the driving session, as each set of captured gestures or movements is analyzed and categorized, the behavioral classification module 126 transmits or streams that information (e.g., by using Bluetooth) to the mobile device 102 to be stored as driver behavior data 106A in the memory 106. Accordingly, the data 106A indicates the determined driving behavior for each set of captured gestures or movements. In some embodiments, the behavioral classification module 126 may transmit the determined driving behavior for each set of captured gestures or movements to the mobile device 102 at the end of the driving session.

The driver behavior data 106A may be analyzed by the mobile device 102 to determine risk of losses. To do so, the mobile device 102 includes a risk assessment module 128, which may be in the form of computer executable instructions stored in the memory 106 and executed using the one or more processors 104.

The risk assessment module 128 performs risk assessment by correlating the driving behaviors in the data 106A with potential recognizable losses involving the driver (e.g., injuries, fatalities, etc.) and/or the vehicle 112 operated by the driver (e.g., crashes, damages, etc.). For example, the data 106A may specify a "texting while driving" behavior for the driver, which indicates or suggests that the driver's attention was diverted or distracted during the driving session. As such, the risk assessment module 128 may calculate a high (or higher) risk of loss because such behavior has a high likelihood of incurring a recognizable loss (e.g., a crash or an accident). On the other hand, if the data 106A specifies a "two hands on wheel, head looking forward" behavior for the driver, then the risk assessment module 128 may calculate a low (or lower) risk of loss because such behavior shows that the driver was focused on driving and thus less likely to incur a loss during the driving session.

Based on the risk of losses determined for the driving behaviors, the risk assessment module 128 may assign ratings for the driver. More particularly, the risk assessment module 128 may aggregate the risk of losses determined for all driving behaviors in a given driving session to generate a driving session rating. The driving session rating may be stored in the memory 106 as driver ratings data 106B. The driving session rating may be in the form of any desired metric such as a label grade (e.g., good, fair, or poor), a letter grade, a numerical grade, etc. Further, the risk assessment module 128 may aggregate the driving session ratings determined for all driving sessions undertaken by the driver in order to produce an overall driver score. The overall driver score may be in the form of any desired metric (e.g., a number, a percentage, etc.), and stored as part of the driver ratings data 106B.

In some embodiments, both the behavioral classification module 126 and the risk assessment module 128 may be stored in the memory 120 and executed using the one or more processors 118 of the on-board computer 116. In this scenario, all data processing is performed at the on-board computer 116. In other words, after the behavioral classification module 126 determines the driver's driving behaviors based on the captured gestures or movements at the on-board computer 116, the risk assessment module 128 also determines the risk of losses and any associated driving session ratings and overall driver score for the driver at the on-board computer 116. The resulting information or data may then be transmitted to the mobile device 102 for subsequent storage, viewing and/or submission.

In some embodiments, both the behavioral classification module 126 and the risk assessment module 128 may be stored in the memory 106 and executed using the one or more processors 104 of the mobile device 102. In this scenario, all data processing is performed at the mobile device 102. In other words, all captured gestures or movements that the driver makes while driving are transmitted directly to the mobile device 102. Accordingly, at the mobile device 102, the behavioral classification module 126 determines the driver's driving behaviors based on the captured gestures or movements and the risk assessment module 128 determines the risk of losses and any associated driving session ratings and overall driver score for the driver.

Figure 2A:
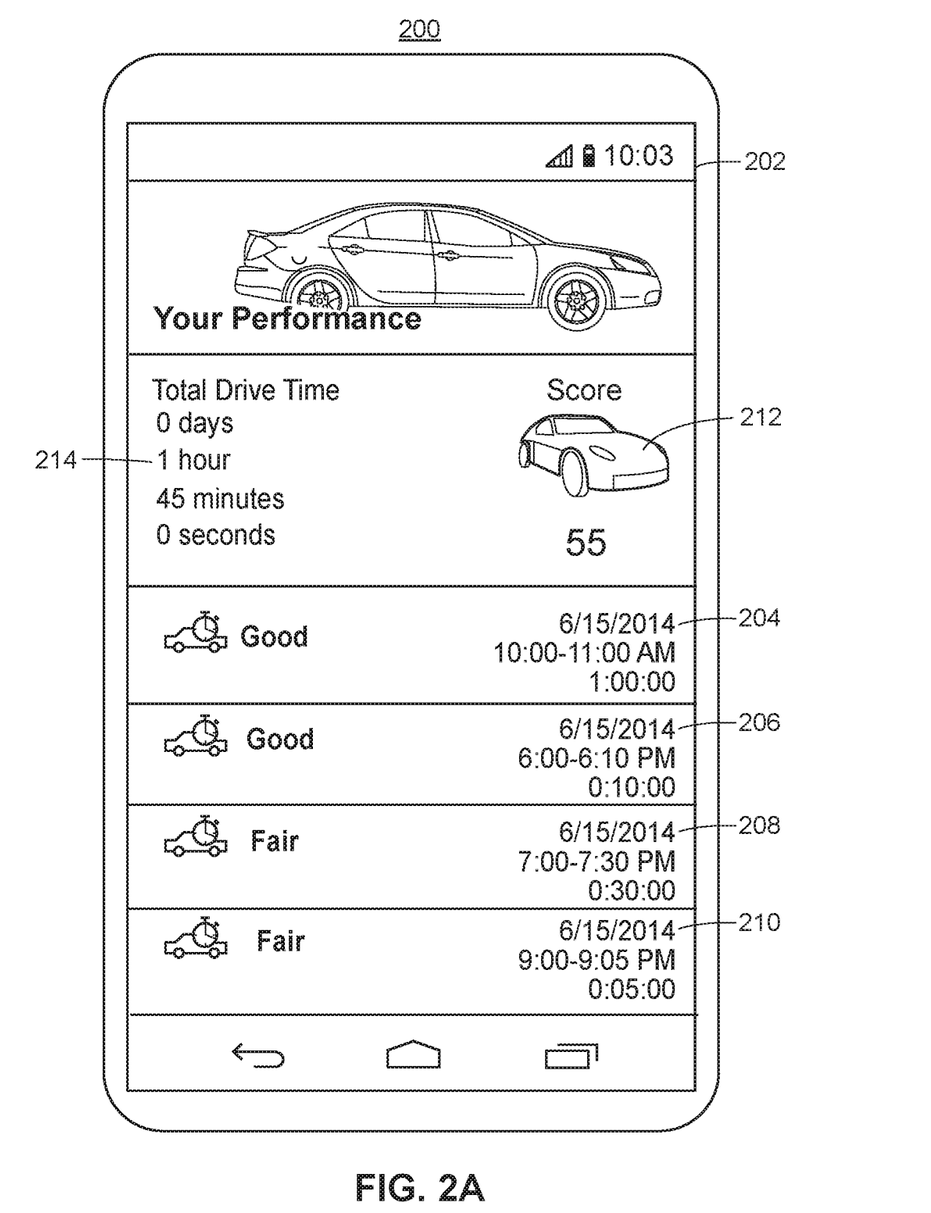
FIG. 2A is a screenshot of an example mobile device displaying ratings for a driver.

The driver may wish to view any or all of the driver ratings data 106B and/or the driver behavior data 106A. FIG. 2A is a screenshot of an example mobile device 200 displaying ratings for a driver. The example mobile device 200 may be similar to the mobile device 102 of FIG. 1. As such, the example mobile device 200 includes a user interface 202 (similar to the user interface 108) that displays the driving session ratings and the overall driver score for the driver. As illustrated in FIG. 2A, four different driving sessions 204-210 are displayed. For each driving session, a timestamp (e.g., date, time and duration of the driving session) and a driving session rating are shown. In FIG. 2A, a label grade is used to indicate the driving session rating for each driving session. For example, the driving sessions 204 and 206 are indicated as being "good" while the driving sessions 208 and 210 are indicated as being "fair."

FIG. 2A also displays an overall driver score 212 for the driver, which may be determined by aggregating or averaging the driving session ratings for the driving sessions 204-210. In FIG. 2A, the overall driver score 212 is shown as a number between 0 (poor overall driving behavior) and 100 (excellent overall driving behavior). Additionally, FIG. 2A shows a total drive time 214 for the driver, which may be determined by summing up the duration time for each of the driving sessions 204-210.

Figure 2B:
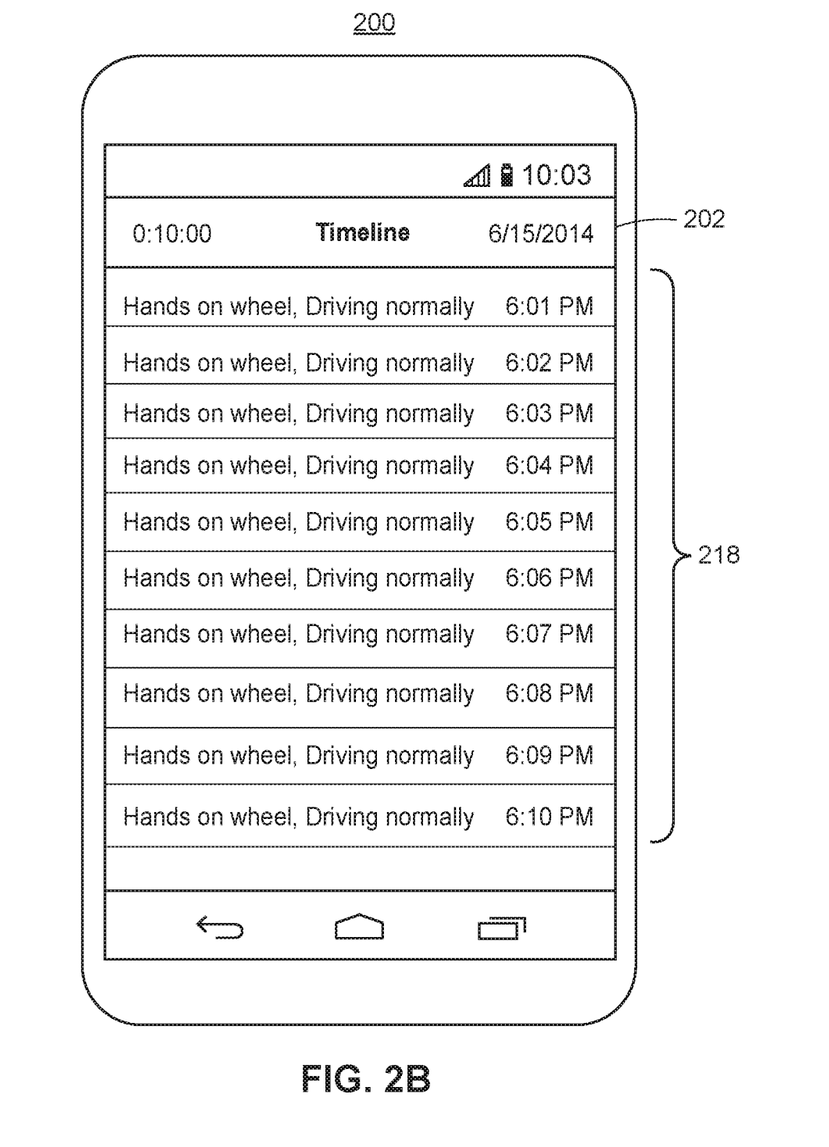
FIG. 2B is a screenshot of an example mobile device displaying driver gesture behaviors of a driver during a driving session.

The driver can manually select any of the driving sessions 204-210 displayed in the user interface 202 to view additional details. This is illustrated in FIG. 2B, which shows a screenshot of the example mobile device 200 displaying driver gesture behaviors of the driver during a particular driving session. Specifically, FIG. 2B shows a plurality determined of driving behaviors 218 for the driving session 206. Each of the plurality of driving behaviors 218 specifies that the driver's hands were on the wheel and thus driving normally during the entire course of driving session 206. Accordingly, the risk of loss associated with each of the plurality of driving behaviors 218 is low, which in turn results in a positive rating (e.g., a "good" label grade) for the driving session 206.

As FIG. 2B illustrates, the driver can see how the driving session rating for a particular driving session is derived by viewing all the determined driving behaviors in the particular driving session. In doing so, the driver can also see distracted or risky driving behaviors, if any, that may negatively affect or impact the driving session rating. In some embodiments, various visual representations pertaining to the driver's driving behaviors over time may be generated to add further clarity or ease of understanding. For example, a pie chart may be generated to show a general breakdown of the driver's driving behaviors or highlight specific driving behaviors of risk (e.g., frequent "texting while driving" behaviors). As another example, a line chart may be generated to show trends in the driver's driving behaviors over a specified period of time. Further, data mining techniques may be employed to provide the driver with personalized tips on which driving behavior(s) needs improvement in order to mitigate potential risk of losses.

Referring again to FIG. 1, the driver may elect to submit any or all of the driver ratings data 106B and/or the driver behavior data 106A to an insurance provider (not shown) for insurance rating purposes. Accordingly, the mobile device 102 may transmit the data 106A, 106B to an external database 130 via a network 132 (e.g., a local area network, a wide area network, a mobile network, a wired or wireless network, a private network, etc.). The external database 130 may be part of the insurance provider's computer system, for example. In some embodiments, the external database 130 may be part of a third party computer system that collects and stores the data 106A, 106B before transmitting the data to the insurance provider via the network 132 or a different network.

Once received, the insurance provider may process the data 106B and/or 106A to determine if any adjustments can be made to the driver's insurance policy premium. For example, if the driver's overall driver score is determined to be consistently high or excellent over a period of time, then the insurance provider may lower the driver's current insurance policy premium or offer the driver a discounted insurance policy premium at renewal time.

Data is only submitted to the external database 130 with the driver's full understanding and acceptance of published terms and conditions for collection and use of that data. This helps to maintain ownership and protect the privacy of any data associated with the driver. The driver may enroll in a full program in which the driver's driving behaviors will be determined, logged, and transmitted to the insurance provider when desired.

Further, the driver may enroll in a trial program in which the driver's driving behaviors will be determined and logged as usual, but the transmission capability to the insurance provider is disabled. In this scenario, the driver may use the trial program for as long as the driver desires. If the driver is satisfied with what he or she sees in the trial program (e.g., his or her overall driver score, driving session ratings or determined driving behaviors), then the driver may opt to upgrade to the full program to have the ability to send data to the insurance provider. At any point in time, the driver may opt to unsubscribe from the trial and/or full program. This will be a complete and permanent removal. As such, when the driver unsubscribes, all of the driver's data will be deleted and purged from the insurance provider's computer system. Thus, even if the driver decides to re-enroll sometime in the future, the driver's old data will not be restored. This is done to demonstrate that the driver's data is owned by the driver, and that the insurance provider will not use any of the data against the driver in any way.

Moreover, as can be seen from the above the discussion, the system 100 drastically improves the process by which driver gesture behaviors are determined, at least in part by providing an automatic and accurate way of detecting and capturing various gestures or movements made by the driver while driving a vehicle. In turn, this improves the process by which risk assessment based on driver gesture behaviors is performed for the driver in order to adjust or modify the driver's insurance premium. In this manner, the resource usage or consumption of the system 100 during the process of assessing risk based on driver gesture behaviors may be greatly reduced. For example, the number of processor cycles utilized by the mobile device 102 and/or the on-board computer 116 from capturing the driver's gestures or movements while driving to determining adjustments, if any, of the driver's insurance policy premium may be greatly reduced by the system 100. Further, the total number of messages or traffic sent over the network 132 to the insurance provider during the risk assessment process is also greatly reduced, thereby increasing efficiencies of the network 132. Still further, as only data related to the driver's driving behaviors and/or ratings (e.g., the data 106A, 106B) is sent to the insurance provider, the amount of data storage required (e.g., at the database 130) for insurance rating purposes for the driver is also greatly reduced.

Figure 3:
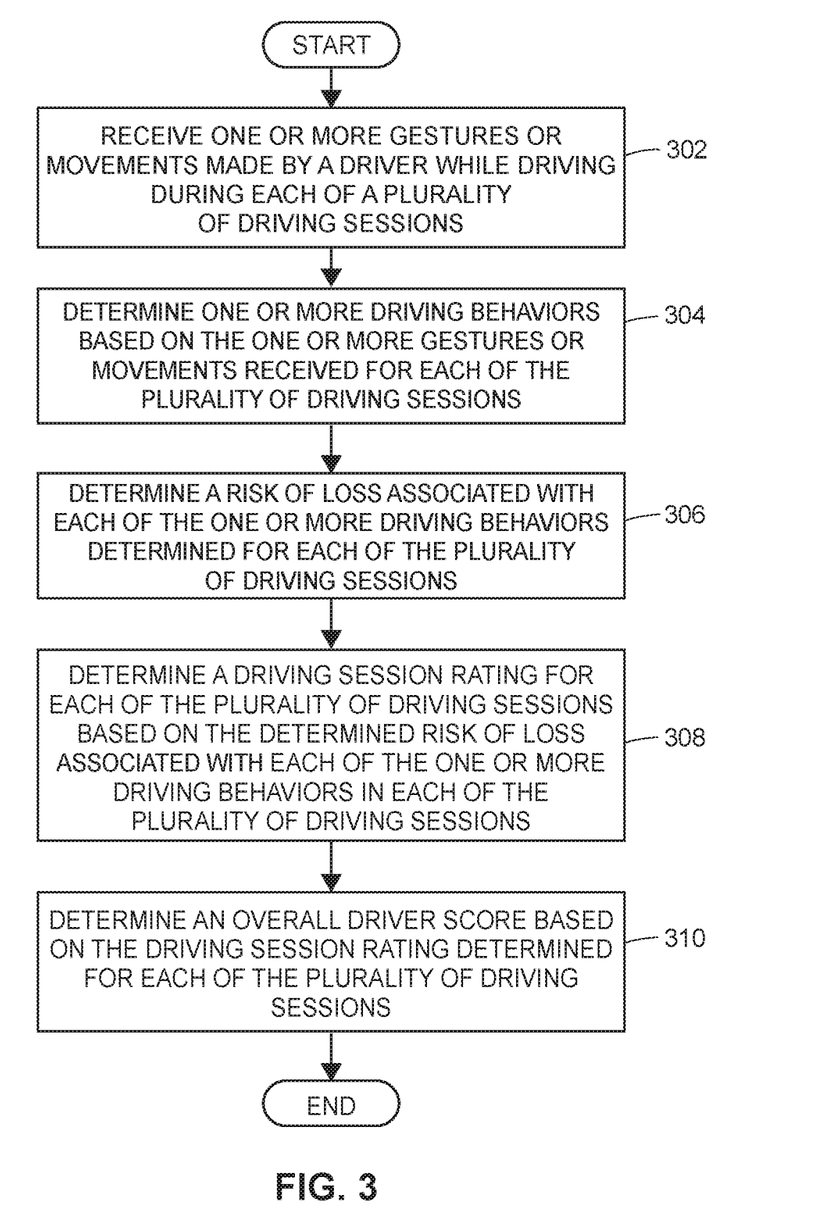
FIG. 3 is a flow diagram of an example method for assessing risk based on driver gesture behaviors.

Referring now to FIG. 3, which describes a flow diagram of an example method 300 for assessing risk based on driver gesture behaviors. The method 300 may include one or more blocks, routines or functions in the form of computer executable instructions that are stored in a tangible computer-readable medium (e.g., 106, 120 of FIG. 1) and executed using a processor (e.g., 104, 118 of FIG. 1).

The method 300 begins by receiving one or more gestures or movements made by a driver while driving a vehicle during each of a plurality of driving sessions (block 302). The method 300 may receive the one or more gestures of movements from a motion sensing device (e.g., the motion sensing unit 124 of FIG. 1) that is included in the vehicle. The motion sensing device operates to detect and capture various head, face, eyes, hands, arms or body gestures or movements that the driver makes while driving the vehicle. Each of the one or more gestures or movements captured for each driving session also includes a respective timestamp that indicates the date and time of capture.

Next, the method 300 determines one or more driving behaviors based on the one or more gestures or movements received for each of the plurality of driving sessions (block 304). For each driving session, the method 300 may determine the one or more driving behaviors by using any, all or a combination of the one or more gestures or movements received for each of the plurality of driving sessions. As an example, if the gestures or movements received for a driving session show that the driver's two hands were on the wheel while the driver's head was looking forward, then the method 300 may determine the driving behavior to be "two hands on wheel, head looking forward." As another example, if the gestures or movements received for a driving session show that the driver had only one hand on the wheel while the driver was eating a sandwich with the other hand, then the method 300 may determine the driving behavior to be "eating food while driving." The method 300 may further classify each determined driving behavior as corresponding to either normal or distracted driving behavior. For example, the "two hands on wheel, head looking forward" behavior may be considered a normal driving behavior, whereas the "eating food while driving" behavior may be considered a distracted driving behavior.

The method 300 then proceeds to determine a risk of loss for or associated with each of the one or more driving behaviors determined for each of the plurality of driving sessions (block 306). Here, the method 300 performs risk assessment for each determined driving behavior by correlating each determined driving behavior with potential recognizable losses involving the driver and/or the vehicle operated by the driver. In other words, the method 300 correlates each determined driving behavior with the likelihood or probability that each determined driving behavior will incur a recognizable loss. For example, if a "eating food while driving" behavior was determined for the driver during a driving session, then the method 300 may determine or calculate a high (or higher) risk of loss because such behavior suggests that the driver's attention was distracted during the driving session and thus more likely to incur a loss (e.g., causing a crash or accident). On the other hand, if a "two hands on wheel, head looking forward" behavior was determined for the driver during a driving session, then the method 300 may determine or calculate a low (or lower) risk of loss because such behavior indicates that the driver was focused on driving during the driving session and thus less likely to incur a loss.

Afterward, the method 300 determines a driving session rating for each of the plurality of driving sessions based on the determined risk of loss associated with each of the one or more driving behaviors in each of the plurality of driving sessions (block 308). More particularly, for each driving session, the method 300 may compile and aggregate the risk of losses determined for all the driving behaviors in the driving session to generate the driving session rating. The driving session rating may be in the form of a label grade (e.g., good, fair, or poor), a letter grade, a numerical grade, or any other desired metric.

Further, the method 300 determines an overall driver score based on the driving session rating determined for each of the plurality of driving sessions (block 310). Accordingly, the method 300 may compile and aggregate the driving session ratings determined for all the driving sessions in order to produce the overall driver score. The overall driver score may be in the form of any desired metric, such as number, a percentage or the like.

In some embodiments, the method 300 may include additional blocks not shown in FIG. 3. For example, the method 300 may display the driving session rating determined for each of the plurality of driving sessions and/or the overall driver score to a user (e.g., the driver). The method 300 may display this information via the user interface 108 of FIG. 1, for example. The method 300 may also submit or transmit the driving session rating determined for each of the plurality of driving sessions and/or the overall driver score to an insurance provider for insurance rating purposes. The method 300 may transmit this information upon receiving an indication or approval from the user, for example.

The method 300 may be implemented on different computing devices. For example, the driver may bring a mobile device (e.g., the mobile device 102 of FIG. 1) to the vehicle and establish a connection between the mobile device and an on-board computer of the vehicle (e.g., the on-board computer 116 of FIG. 1) during a driving session. The connection between the mobile device and the on-board computer may be established using short range wireless communication such as Bluetooth, for example. In this scenario, the blocks 302 and 304 may be implemented on the on-board computer of the vehicle. That is, the on-board computer may process the received gestures or movements made by the driver while driving to determine driving behaviors for the driving session. The on-board computer may then transmit the determined driving behaviors to the mobile device for further processing. Accordingly, the blocks 306-310 may be implemented on the mobile device. In other words, the mobile device may process the driving behaviors received from the on-board computer to determine risk of losses and any associated driving session rating and overall driver score. In some embodiments, the method 300 may be implemented on one computing device. For example, the blocks 302-310 may be implemented on the mobile device or the on-board computer.

Using the system 100 and the method 300, risk assessment may be performed based on driver gesture behaviors for insurance rating purposes. However, applications for such systems and methods are not limited to the field of insurance. Applications in other fields or industries may include assessing driver gesture behaviors for use in education to enhance driver safety, assessing driver gesture behaviors for use in vehicle design to improve driver comfort and ergonomics, and the like.

Figure 4:
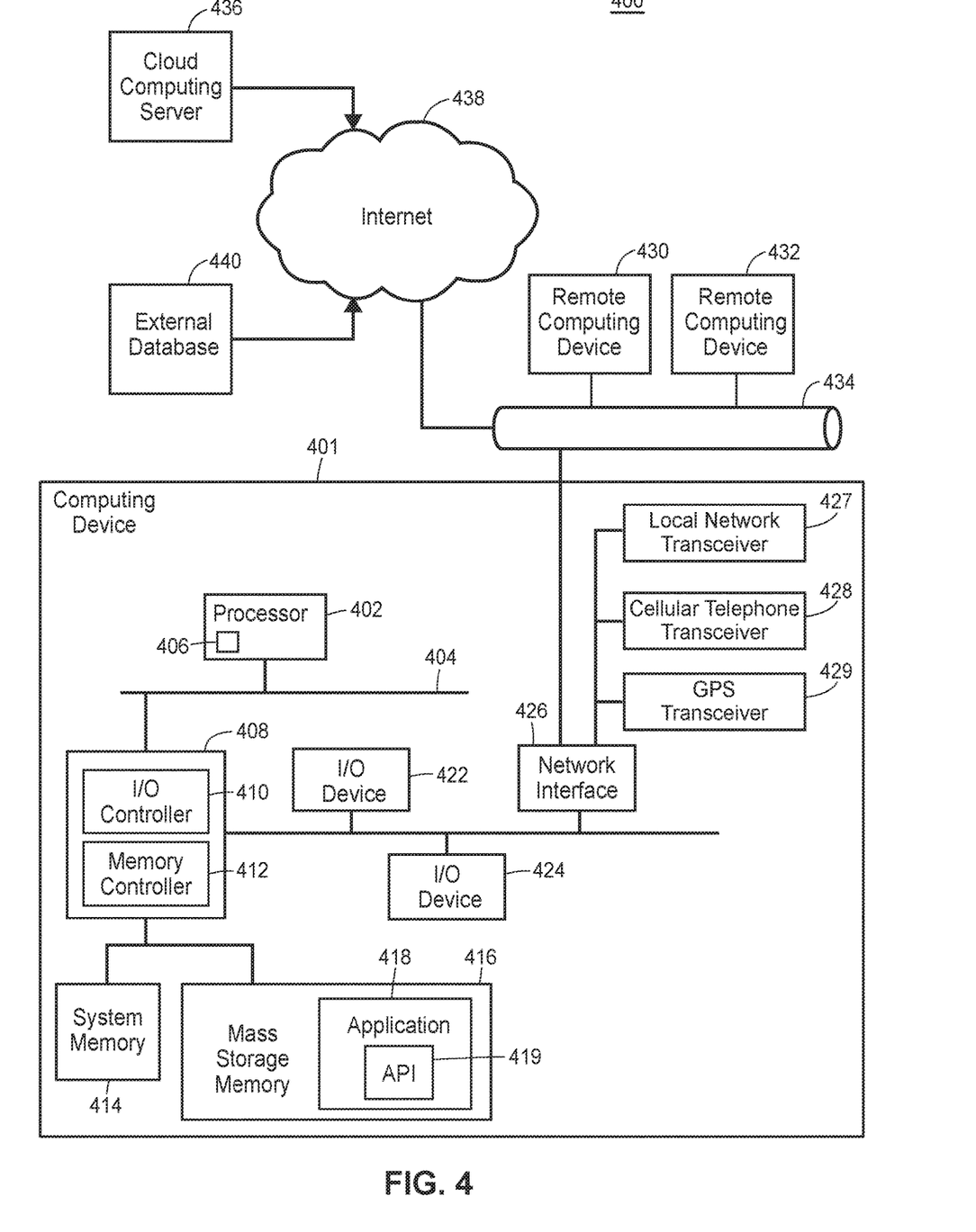
FIG. 4 is a block diagram of a computing environment that implements a system and method for assessing risk based on driver gesture behaviors.

FIG. 4 is a block diagram of an example computing environment for a system 400 having a computing device 401 that may be used to implement the systems and methods described herein. The computing device 401 may be a mobile computing device (e.g., smart phone, a tablet, a Wi-Fi-enabled device, etc.), an on-board vehicle computer, or other types of computing devices. Processor systems similar or identical to the example system 400 may be used to implement and execute the example system of FIG. 1, the method of FIG. 3, and the like. Although the system 400 is described below as including a plurality of peripherals, interfaces, chips, memories, etc., one or more of those elements may be omitted from other example processor systems used to implement and execute the example system 100. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416, that may include either or both of an in-memory cache (e.g., a cache within the memory 414) or an on-disk cache (e.g., a cache within the mass storage memory 416).

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement an application 418 having an API 419 (including functions and instructions as described by the method 300 of FIG. 3). The mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the system 400. Thus, a module, block, function, operation, procedure, routine, step, and method can be implemented in hardware, firmware, and/or software. In one embodiment, program modules and routines (e.g., the application 418, the API 419, etc.) are stored in mass storage memory 416, loaded into system memory 414, and executed by a processor 402 or can be provided from computer program products that are stored in tangible computer-readable storage mediums (e.g., RAM, hard disk, optical/magnetic media, etc.).

The peripheral I/O controller 410 performs functions that enable the processor 402 to communicate with peripheral input/output (I/O) devices 422 and 424, a network interface 426, a local network transceiver 427, a cellular network transceiver 428, and a GPS transceiver 429 via the network interface 426. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The cellular telephone transceiver 428 may be resident with the local network transceiver 427. The local network transceiver 427 may include support for a Wi-Fi network, Bluetooth, infrared or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The system 400 may also implement the application 418 on remote computing devices 430 and 432. The remote computing devices 430 and 432 may communicate with the computing device 401 over an Ethernet link 434. In some embodiments, the application 418 may be retrieved by the computing device 401 from a cloud computing server 436 via the Internet 438. When using the cloud computing server 436, the retrieved application 418 may be programmatically linked with the computing device 401. The application 418 may be a Java® applet executing within a Java® Virtual Machine (JVM) environment resident in the computing device 401 or the remote computing devices 430, 432. The application 418 may also be "plug-ins" adapted to execute in a web-browser located on the computing devices 401, 430, and 432. Further, the application 418 may be adapted to execute in a web-browser using JavaScript. In some embodiments, the application 418 may communicate with a back-end component 440 such as the external database 130 via the Internet 438.

The system 400 may include but is not limited to any combination of a LAN, a MAN, a WAN, a mobile, a wired or wireless network, a private network, or a virtual private network. Moreover, while only two remote computing devices 430 and 432 are illustrated in FIG. 4 to simplify and clarify the description, it is understood that any number of client computers are supported and can be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for assessing risk based on driver gesture behaviors for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for assessing risk based on driver gesture behaviors through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for assessing risk based on driver behavior, the method comprising:
   receiving, at one or more electronic devices including an on-board computer of a vehicle, data representing movements of a driver of a vehicle captured via a mobile device;
   analyzing the data via the one or more electronic devices to:
     (i) determine via the one or more electronic devices that the data represents, at least in part, (a) a first detected hand placement of the driver relative to a steering wheel of a vehicle at a first time, and (b) a second detected hand placement of the driver relative to the steering wheel at a second time; and
     (ii) determine via the one or more electronic devices: (a) a first non-binary value representing a first risk of loss correlated to the first detected hand placement relative to the steering wheel and (b) a second non-binary value representing a second risk of loss correlated to the second detected hand placement relative to the steering wheel;
   calculating, via the one or more electronic devices, a driving score based, at least in part, on the first and second determined non-binary values representing the first and second risks of loss; and
   displaying, via at least one of the one or more electronic devices, the driving score.

2. The computer-implemented method of claim 1, wherein the driving score is a first driving score for a first driving session:
   wherein the data is first data;
   wherein the computer-implemented method further includes:
     (A) analyzing second data representing movements of the driver captured during a second driving session to: (i) determine that the second data represents, at least in part, a one or more detected hand placements relative to the steering wheel during the second driving session; and (ii) determine one or more risks of loss based on the one or more hand placements detected during the second driving session;
     (B) calculating a second driving score based, at least in part, on the determined one or more risks of loss;
     (C) calculating an overall driving score based on both the first and second driving scores; and
     (D) displaying the overall driving score.

3. The computer-implemented method of claim 1, wherein the analyzing further comprises: analyzing the data to determine the data represents, at least in part, a plurality of driver gestures, wherein the plurality of driver gestures includes the detected hand placement of the driver relative to the steering wheel and at least one other driver gesture.

4. The computer-implemented method of claim 3, further comprising: classifying each of the plurality of driver gestures into a first class representing non-distracted behavior or a second class representing distracted behavior.

5. The computer-implemented method of claim 1, wherein one or more of the first and second detected hand placements relative to the steering wheel represents a detection that two hands are on the steering wheel.

6. The computer-implemented method of claim 1, wherein the mobile device is mounted to the interior of the vehicle.

7. The computer-implemented method of claim 1, wherein the receiving comprises wirelessly receiving.

8. The computer-implemented method of claim 1, wherein the one or more electronic devices further comprises a server external to the vehicle.

9. The computer-implemented method of claim 1, wherein each of the one or more electronic devices is disposed on or in the vehicle.

10. A system for assessing risk based on driver behavior, the system comprising:
    a communication interface operable to be communicatively coupled to a mobile device;
    one or more processors coupled to the communication interface;
    one or more memories coupled to the one or more processors, the one or more memories storing computer readable instructions that, when executed, cause the one or more processors to:
      (i) identify data, received from the mobile device, representing movements of a driver of a vehicle;
      (ii) analyze the data to:
        (a) determine that the data represents, at least in part, (a) a first detected hand placement of the driver relative to a steering wheel of a vehicle at a first time, and (b) a second detected hand placement of the driver relative to the steering wheel at a second time; and
        (b) determine: (a) a first non-binary value representing a first risk of loss correlated to the first detected hand placement relative to the steering wheel and (b) a second non-binary value representing a second risk of loss correlated to the second detected hand placement relative to the steering wheel;
      (iii) calculate a driving score based, at least in part, on the first and second determined non-binary values representing the first and second risks of loss; and
      (iv) display, via a display coupled to the one or more processors, the driving score.

11. The system of claim 10, wherein the driving score is a first driving score for a first driving session and wherein the data is first data;
wherein the instructions further include instructions that, when executed, cause the one or more processors to:
(A) analyze second data representing movements of the driver captured during a second driving session to: (i) determine that the second data represents, at least in part, one or more detected hand placements relative to the steering wheel during the second driving session; and (ii) determine one or more risks of loss based on the one or more hand placements detected during the second driving session;
(B) calculate a second driving score based, at least in part, on the determined one or more risks of loss;
(C) calculate an overall driving score based on both the first and second driving scores; and
(D) display the overall driving score.

12. The system of claim 10, wherein the instructions to cause the one or more processors to analyze the data further include instructions that, when executed, cause the one or more processors to: analyze the data to determine the data represents, at least in part, a plurality of driver gestures, wherein the plurality of driver gestures includes the detected hand placement of the driver relative to the steering wheel and at least one other driver gesture.

13. The system of claim 12, further comprising: classifying each of the plurality of driver gestures into a first class representing non-distracted behavior or a second class representing distracted behavior.

14. The system of claim 10, wherein one or more of the first and second detected hand placements relative to the steering wheel represents a detection that two hands are on the steering wheel.

15. The system of claim 10, wherein the mobile device is mounted to the interior of the vehicle.

16. The system of claim 10, wherein the data received via the communication interface is wirelessly received.

17. The system of claim 10, wherein at least one of the one or more processors is a processor for a server external to the vehicle.

18. The system of claim 10, wherein at least one of the one or more processors is a processor for an on-board computer disposed on or in the vehicle.

* * * * *